H. M. GILBERT.
APPARATUS FOR SORTING AND GRADING FRUITS AND VEGETABLES.
APPLICATION FILED DEC. 28, 1912.
1,083,397.
Patented Jan. 6, 1914.
2 SHEETS—SHEET 1.
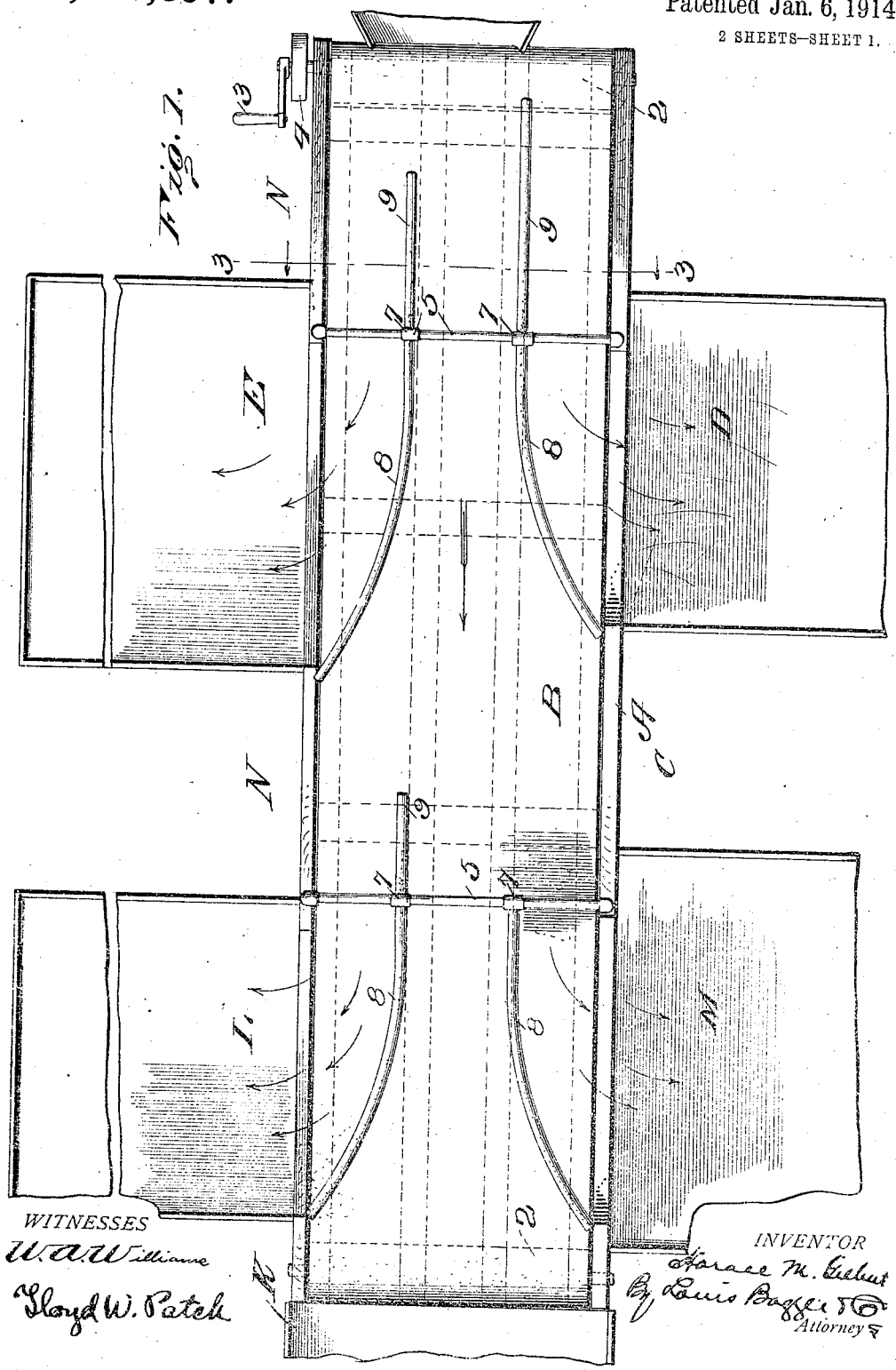

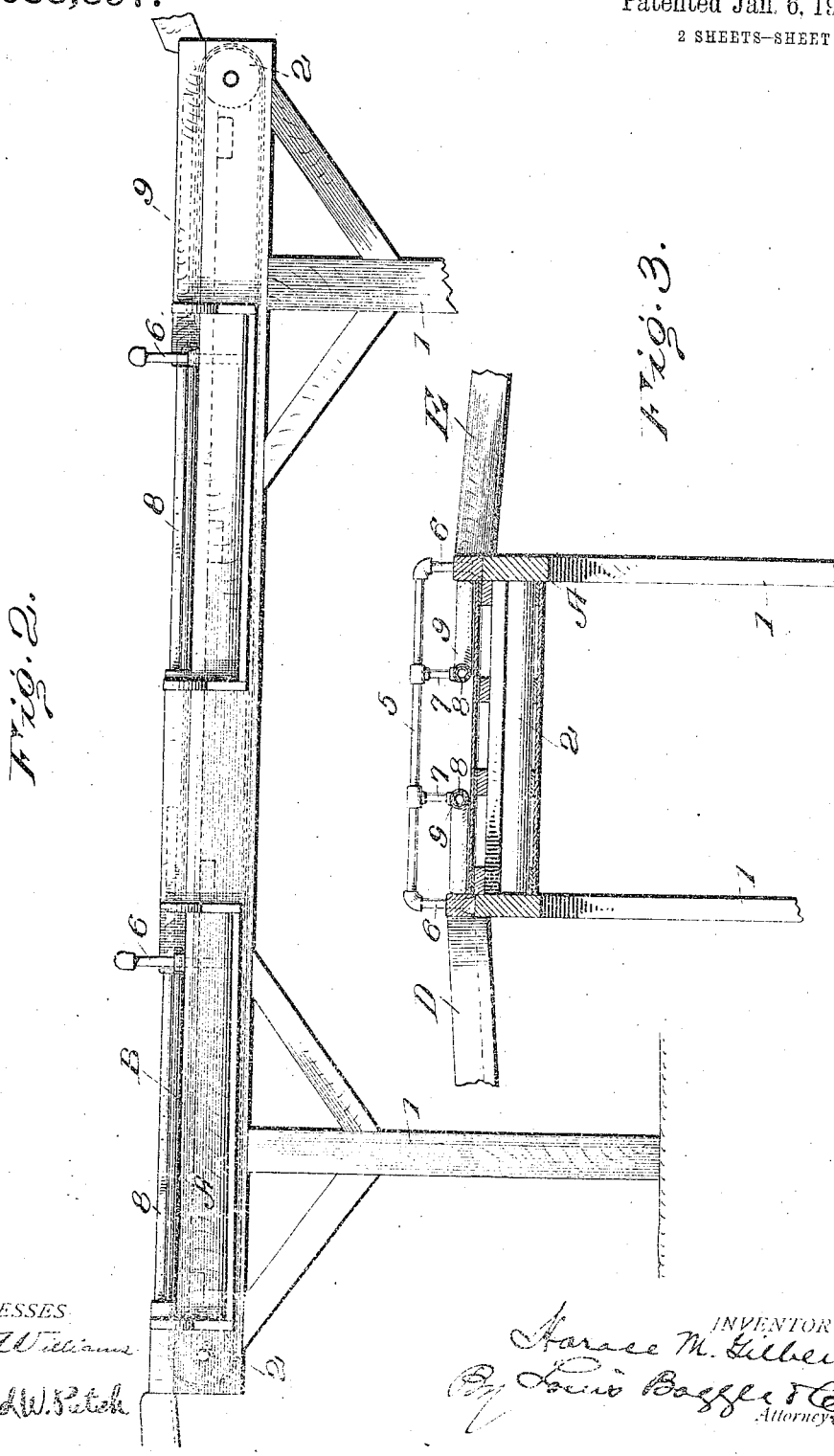

UNITED STATES PATENT OFFICE.

HORACE M. GILBERT, OF NORTH YAKIMA, WASHINGTON.

APPARATUS FOR SORTING AND GRADING FRUITS AND VEGETABLES.

1,083,397.  Specification of Letters Patent.  Patented Jan. 6, 1914.

Application filed December 28, 1912. Serial No. 739,132.

*To all whom it may concern:*

Be it known that I, HORACE M. GILBERT, a citizen of the United States, residing at North Yakima, in county of Yakima and State of Washington, have invented certain new and useful Improvements in Apparatus for Sorting and Grading Fruits and Vegetables, of which the following is a specification.

My invention relates to an improvement in apparatus for sorting and grading fruits and vegetables, and the object is to provide an endless belt mounted on a frame upon which belt the fruit or vegetables are deposited, and means mounted upon the frame adapted to sort the fruit and grade it according to its size and discharge it to the sides of the table so that the fruit is sorted to suit the operator.

The invention consists of certain novel features of construction and combinations of parts which will be hereinafter fully described and pointed out in the claims.

In the accompanying drawings,—Figure 1 is a top plan view; Fig. 2 is a view in side elevation; Fig. 3 is a cross sectional view on the line 3—3 of Fig. 1.

A represents a table which is supported by uprights 1, 1. The frame of the table A has rollers 2, 2, at the end thereof. An endless belt B is mounted upon the rollers 2. One of the rollers is provided with a crank handle 3 at one end whereby the roller can be operated manually for driving the belt B or the belt can be placed over the pulley 4 which is on the same end as the handle 3 for the purpose of driving the belt.

Cross bars 5, 5, are supported upon the table frame A at predetermined intervals by means of standards 6, 6. Arms 7 project downwardly from each bar 5 and supported by each arm 7 of each bar 5 are curved rods 8, 8. These curved rods 8 are preferably provided with a rubber covering or tubing 9 as shown more particularly in Fig. 3.

Located adjacent to the first set of rods 8 are tables D and E, and opposite the second set of rods 8 are tables M and L. The fruit is fed or deposited upon an end of the table termed the "receiving end" and a sorter stands at this point sorting the apples, causing the good apples to travel through the center of the belt and between the rods 8, while the apples that are poorly colored are fed to the opposite side of the table so that they are carried and fed on to the table E, while the blemished or worm affected apples are removed to the near side of the table so that the rod 8 feeds the apples on to the table D. The apples are taken from the tables D and E and packed accordingly. When it is desired to sort the apples into sizes, a sorter who is stationed at C sorts the apples into three sizes, distributing them so that one size passes between the rods 8 and are fed to the end of the table onto a platform K, while others are fed onto a table or platform L, and the third size is fed onto the platform or table M. When it is desired these two sorters can have assistants stationed at the points N, N.

It is to be noted that the rods 8 project rearwardly from the bars 5 in a straight line but curve outwardly as they project in a forward direction and beyond the cross bars 5 so that the fruit or vegetables are fed onto the platforms according to their sizes or grades.

From the foregoing it will be seen that I have provided means whereby the fruit or vegetables can be graded and discharged onto the platforms or tables along the sides of the table frame A so that they can be packed ready for shipment according to their grades. Furthermore, there is less liability of bruising or injuring the apples when they are handled upon the traveling belt because they can be moved across the belt by the operators or sorters, and they are gradually and easily fed onto the tables so that there is little or no danger of the apples or vegetables being bruised.

Having fully described my invention, what I claim as new and desire to secure by Letters Patent is—

1. In a grader of fruits, vegetables and the like, the combination with a frame having rollers journaled therein, of an endless belt mounted on the rollers, means for driving the belt, a stationary cross bar supported by the frame and above the table, and means suspended from the cross bar for conveying the fruit off at the outer edges of the belt, said means so located with respect to the belt that a central and uninterrupted passage is formed throughout the length of the machine.

2. In a grader, the combination with a table frame having rollers journaled therein, of an endless belt mounted upon the rollers, means for driving the belt, tables located at intervals along the frame, stationary cross bars mounted upon the frame and extending at an elevation across the belt, and stationary curved members suspended from the cross bars for conducting the fruit or vegetables onto the tables at the edges of the belt and located along the edges of the belt forming a central passage through the length of the machine.

3. In a grader, the combination with a frame having rollers mounted thereon, of an endless belt mounted upon the rollers, means for driving the belt, and stationary cross bars mounted upon the frame and extending at an elevation across the belt, stationary curved members mounted upon the cross bars, and located over the belt for conducting fruit to the edges of the belt, said members located with respect to each other for forming a central passage throughout the length of the machine, and tables located along the sides of the frame and at the end of the frame for receiving the fruit discharged at the edges of the frame by the bars and the fruit discharged at the end.

In testimony whereof I affix my signature, in the presence of two witnesses.

HORACE M. GILBERT.

Witnesses:
VELMA VAN BUSKIRK,
J. W. WARRELL.